United States Patent
Salina et al.

(10) Patent No.: US 6,184,665 B1
(45) Date of Patent: Feb. 6, 2001

(54) INTEGRATED CURRENT MODE PWM DRIVE SYSTEM SUPPLY VOLTAGE SCALEABLE WHILE RETAINING A HIGH PRECISION

(75) Inventors: Alberto Salina, Limbiate; Donatella Brambilla, Perticato di Mariano Comense, both of (IT)

(73) Assignee: STMicroelectronics S.r.l., Agrate Brianza (IT)

(*) Notice: Under 35 U.S.C. 154(b), the term of this patent shall be extended for 0 days.

(21) Appl. No.: 09/174,867

(22) Filed: Oct. 19, 1998

(30) Foreign Application Priority Data

Oct. 23, 1997 (EP) ................................................ 97830533

(51) Int. Cl.$^7$ ................................. G05F 1/40; G05F 1/00
(52) U.S. Cl. ........................................... 323/282; 318/678
(58) Field of Search .................................. 323/282; 363/63, 363/56, 98; 318/287, 681, 679, 678; 128/419 PG

(56) References Cited

U.S. PATENT DOCUMENTS

| | | |
|---|---|---|
| 4,066,945 | 1/1978 | Korte, Jr. . |
| 4,436,093 | * 3/1984 | Belt ................................ 128/419 PG |
| 4,596,252 | * 6/1986 | Nelson ........................... 128/419 PG |
| 5,361,776 | * 11/1994 | Samuelson et al. ................. 128/734 |

FOREIGN PATENT DOCUMENTS 0 613 235 A1   2/1994 (EP) ................................. H02P/7/00

* cited by examiner

*Primary Examiner*—Peter S. Wong
*Assistant Examiner*—Rajnikant B. Patel
(74) *Attorney, Agent, or Firm*—Theodore E. Galanthay; Allen, Dyer, Doppelt, Milbrath & Gilchrist, P.A.

(57) ABSTRACT

In a current mode pulse width modulation (PWM) integrated drive system having an external load, a switched-capacitor amplifier and a sample & hold stage connected in cascade form a current sensing amplifier for a control loop. The current sensing amplifier overcomes resistive mismatchings, thus permitting a scaling down of the supply voltage with high precision for the integrated drive system.

28 Claims, 2 Drawing Sheets

INTEGRATED CURRENT MODE PWM DRIVE SYSTEM SUPPLY VOLTAGE SCALEABLE WHILE RETAINING A HIGH PRECISION

FIELD OF THE INVENTION

The present invention relates to current mode switching drive systems, and more particularly, to an integrated current mode pulse width modulation (PWM) drive system for an external load that scales power supply voltages with high precision.

BACKGROUND OF THE INVENTION

Mass memory components such as floppy discs, CD ROMs, and other similar memory components are often found in battery powered portable devices. Rotation of these mass memory components are performed using electric motors which are electronically switched by integrated drive systems.

A prior art diagram for a typical current mode PWM switching drive system is shown in FIG. 1. A generic actuator or external load in the illustrated example is a Voice Coil Motor (VCM). A current control loop is formed at sum node A where a balance occurs between two separate currents applied to this node A. One current is provided by the control voltage Vdac through connecting resistor R1. The other current is provided by the voltage Vsense through connecting resistor R2. The voltage Vsense is provided as an output of a sense amplifier. This sense amplifier portion of the drive system is referred to as a current sense circuit.

The loop further comprises a differential error amplifier coupled between the reference voltage Vref and the voltage present at node A. The feedback voltage closing the control loop is derived from the voltage drop on a sense resistor R3 connected in series with the load VCM.

It is well known in the art that if the differential voltage across the R3 resistor (i.e., Vin1−Vin2) is equal to the level of the reference voltage Vref in the resistive series Ra, Rb, then a current of a relatively small value is provided. Therefore, an eventual mismatching between the resistive ratios Ra/Ra' and Rb/Rb' will not cause sensing inaccuracies in the control system. In contrast, if the differential voltage across the sensing resistor R3 is significantly different from the reference voltage, a mismatching of the actual values of the above mentioned resistors will introduce sensing inaccuracies.

In a typical current mode PWM switching drive system like the one depicted in FIG. 1, the motor's winding is driven through a single bridge with a supply voltage that is typically 12V. Also, the circuitry that forms the control loop is supplied at 12V. The current sense amplifier thus receives input signals ranging between 0 and 12V, and its output is typically half of the supply voltage.

The current sense amplifier is formed using a feedback operational amplifier OP for carrying out a conversion of the differential signal into a "single-ended" output signal Vsense. Consequently, a problem exists when the output voltage Vsense is significantly different with respect to the reference voltage Vref. Such an offset in voltage is caused by mismatching of resistances.

Labeling $V^+$ as the voltage on the positive terminal, the current through Rb is provided by $$I=(V^+-Vref)/Rb.$$

When there is an offset-free operational amplifier, the voltage on the negative terminal is the same. In absence of an input differential signal, the current that flows in the two branches is the same, hence the output voltage is given by $$Vo=V^--I*Rb'=V^+-(V^+-Vref)*(Rb'/Rb).$$

If the matching of resistances are equal (Rb=Rb'), then the output voltage is equal to the reference voltage. Assuming a resistive mismatching (Rb=R, Rb'=R+ΔR), the output voltage is equal to $$Vo=V^--I*Rb'=V^+-(V^+-Vrif)*(1+\Delta R/R).$$

For a best case situation, if there is a matching within 1% of the resistances and a difference of 6V between the common mode signal at the bridge terminals and the reference voltage, then the voltage offset for Vsense is about 60 mV.

Therefore, there is a need to reduce voltage consumption and the size of integrated current mode drive systems. This need is driven by the increased supply voltages applied to these devices, which in turn imposes a scaling down of the supply voltages for the desired loads, as well as the size of the integrated devices themselves.

However, the scaling process provides a voltage difference between the reference voltage Vref and the differential voltage present at the inputs of the current sense amplifier. This difference leads to sensing inaccuracies because of the increase of the difference between the level of the common mode signal on the bridge terminals and the reference voltage level.

SUMMARY OF THE INVENTION

An object of the invention is to address voltage mismatchings that results when a switching current mode integrated drive system scales down the supply voltage. Another object of the invention is to provide other important advantages in terms of enhanced performances of the driving system as a whole, such as reducing the size of an integrated circuit that makes up such a current mode drive system.

According to the present invention, these results are obtained with a current sense amplifier configured as a switched-capacitor amplifier. The current sense amplifier comprises an operational amplifier alternately configured as a buffer and as a charge transfer circuit. The operational amplifier also comprises capacitors and dedicated switches controlled by a pair of complementary control signals. An output of the operational amplifier is applied to a sample & hold output stage.

The system is easily controlled and sampling of the differential voltage (V1−V2) is controlled without being affected by switching transients. In this manner, the control loop is not affected by the common mode signal of the voltage drop monitored on the current sensing resistor. The current sensing resistor is functionally connected in series to the external load of the integrated driving system.

A system made according to the present invention can scale down the voltage to be applied to the load without any loss of accuracy caused by an increased difference between the levels of the compared voltages. The current sense amplifier, operated in a switched-capacitor technique, ensures a theoretically infinite common mode rejection, and hence, a total cancellation of the offset due to inevitable mismatchings of integrated resistances.

DETAILED DESCRIPTION OF THE PREFERRED EMBODIMENTS

Figure 1:
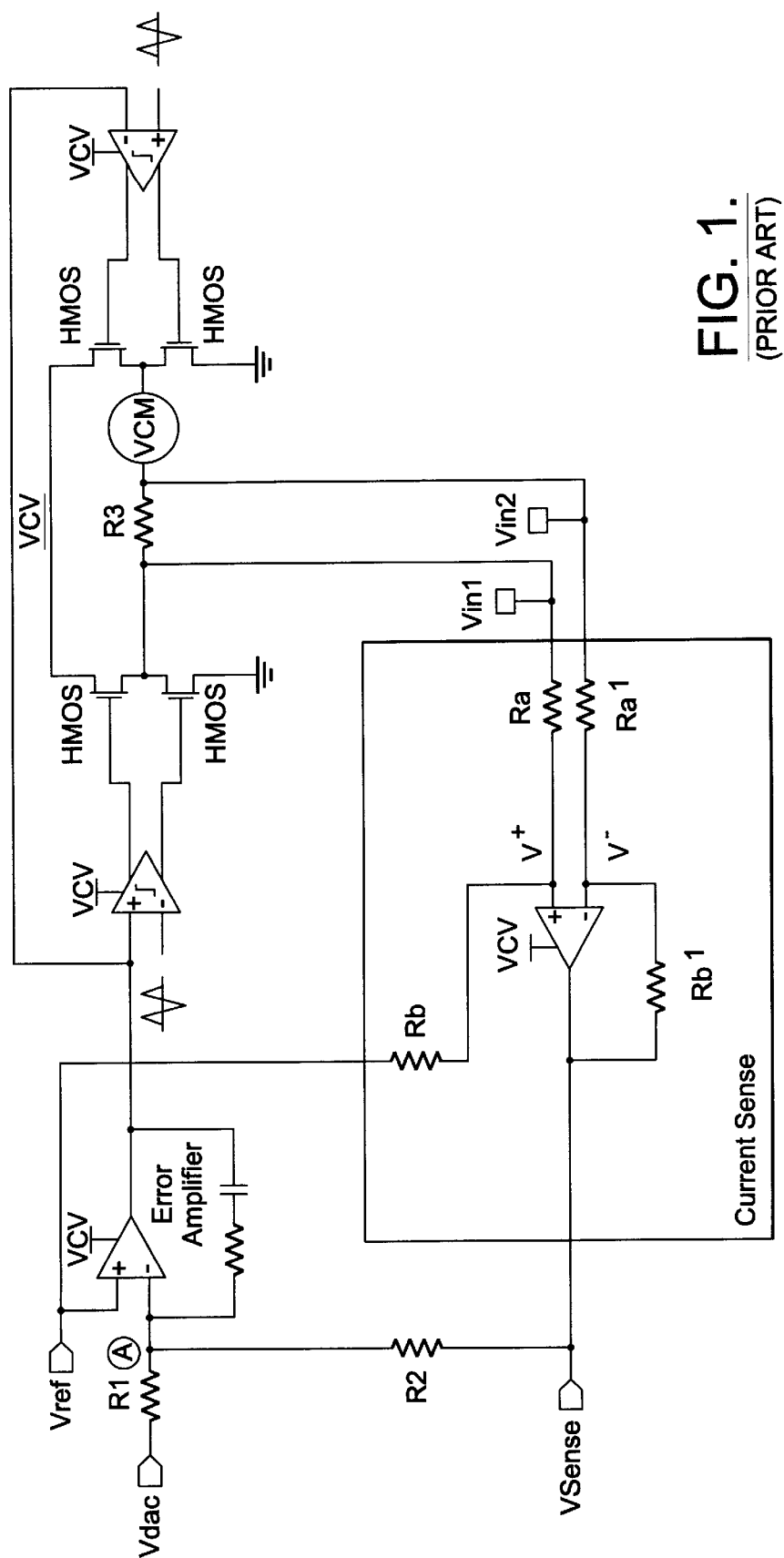
FIG. 1 illustrates a circuit diagram of a current mode switching drive system of the prior art.
Figure 2:
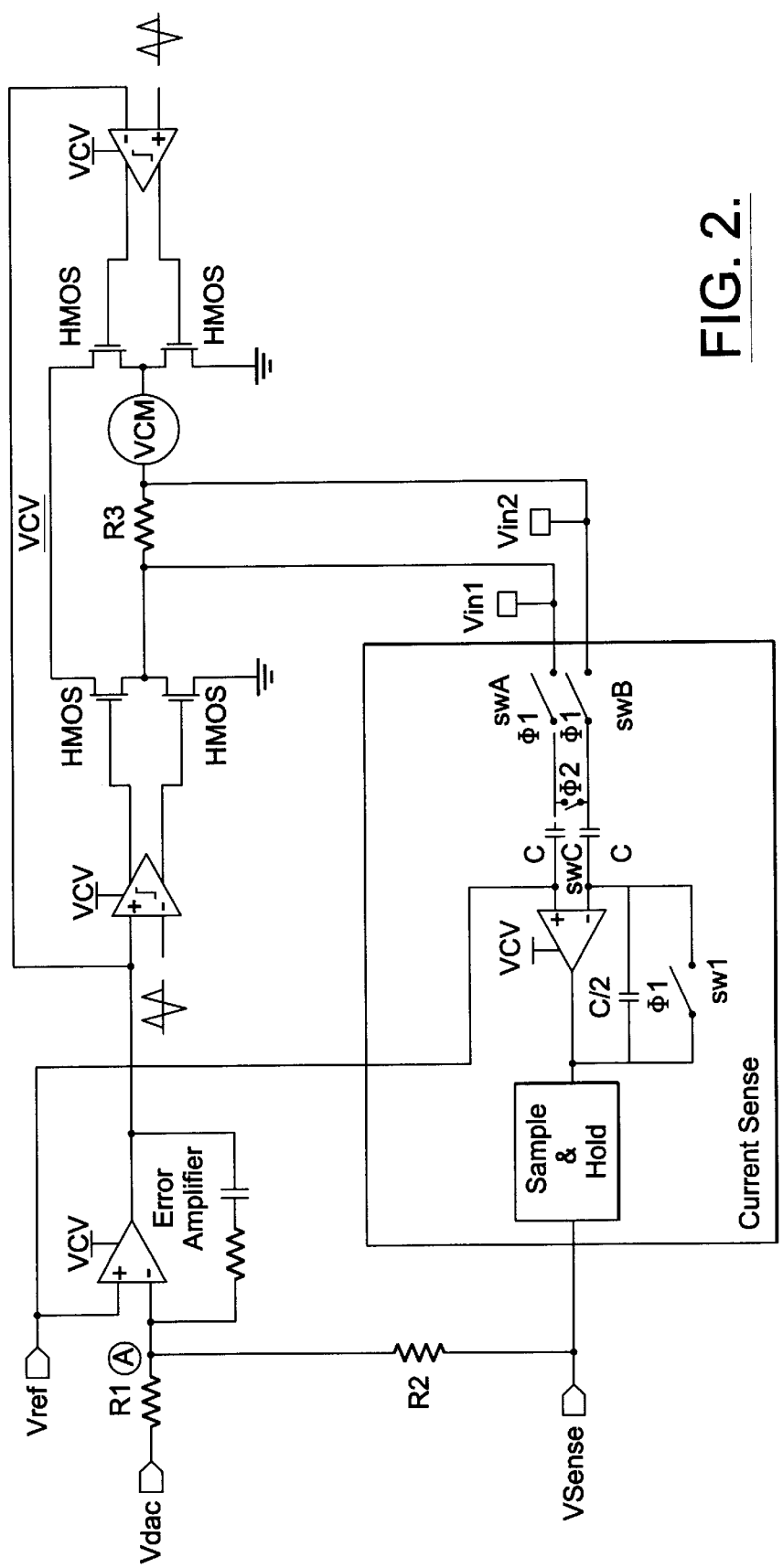
FIG. 2 illustrates a circuit diagram of an embodiment of a current mode switching drive system according to the present invention.

Referring to FIG. 2, a circuit diagram of an embodiment of a current mode switching drive system is illustrated according to the present invention. When phase $\Phi1$ is applied with switches swA, swB and sw1 closed, a sampling of a voltage on a sensing resistor R3 is performed. The operational amplifier OP is configured as a buffer having unity gain. Accordingly, output voltage Vsense is applied to the voltage Vref reference. C1 is charged to Vin1−Vref, and C2 is charged to Vin2−Vref.

When phase $\Phi2$ is applied, the voltage that existed on the sensing resistor R3 is applied to the terminals of capacitors C1 and C2, which are now connected in series. The charge stored by C1 and C2 is equal to $$\Delta Q = (Vin1 - Vin2)*(1/C1 + 1/C2).$$

Feedback of the operational amplifier OP is applied to the negative terminal input of the operational amplifier, and the charge stored in C1 and C2 transfers to C3. In this mode, the output Vsense' undergoes a voltage shift by $$\Delta V = \Delta Q/C3 = [(Vin1-Vin2)*(1/C1+1/C2)]/C3$$

By choosing C1=C2=C and C3=C/2, the output voltage (Vsense) of the operational amplifier OP changes according to the voltage existing on the sensing resistor R3.

To retain this value of Vsense on the output of the current sense amplifier, a sampling and storing stage is implemented. The sampling and storing stage uses a sample & hold function which is coupled in cascade to the output of the operational amplifier OP.

That which is claimed is:

1. An integrated current mode switching drive system for an external load, comprising:
   a differential error amplifier having a first input connected to a first control voltage and a second input connected to a reference voltage;
   a first resistor connected to the first input of said differential error amplifier and receiving a second control signal;
   a second resistor connected to the first input of said differential error amplifier and receiving a third control signal;
   a third resistor connected in series with the external load;
   a current sense amplifier circuit having an input connected across the third resistor and an output generating the third control signal, said current sense amplifier circuit comprising
      a switched capacitor stage comprising an operational amplifier, a plurality of switches and capacitors connected to said operational amplifier so that said operational amplifier is configured alternately as a buffer and charge transfer circuit responsive to a pair of complementary control signals applied to said switches, and
      a sample and hold circuit having an input connected to an output of the switched capacitor stage and having an output generating the third control signal.

2. An integrated current mode switching drive system according to claim 1, further comprising at least one output transistor for supplying current to the external load, and at least one driver connected to said at least one output transistor.

3. An integrated current mode switching drive system according to claim 1, wherein said plurality of capacitors comprises first and second input capacitors connected to respective first and second inputs of the operational amplifier.

4. An integrated current mode switching drive system according to claim 3, wherein the first and second capacitors have substantially equal capacitance values.

5. An integrated current mode switching drive system according to claim 3, wherein said plurality of capacitors further comprises a feedback capacitor connected between an input and an output of said operational amplifier.

6. An integrated current mode switching drive system according to claim 5, wherein the first and second capacitors have substantially equal capacitance values; and wherein the feedback capacitor has a capacitance value equal to about one half of the capacitance value of the first and second input capacitors.

7. An integrated current mode switching drive system according to claim 5, wherein said plurality of switches comprises first and second input switches connected in series between respective ones of said first and second input capacitors and said third resistor.

8. An integrated current mode switching drive system according to claim 7, wherein said plurality of switches further comprises a third switch connected across the first and second input capacitors.

9. An integrated current mode switching drive system according to claim 8, wherein said plurality of switches further comprises a fourth switch connected in parallel with said feedback capacitor.

10. An integrated current mode switching drive system according to claim 1, wherein the voltage reference is smaller than a differential voltage at the input of said current sense amplifier circuit.

11. An integrated current mode switching drive system for an external load, comprising:
    a differential error amplifier having a first input and a second input connected to a reference voltage;
    a sensing resistor connected in series with the external load; and
    a current sense amplifier circuit having an input connected across the sensing resistor and an output coupled to the first input of said differential error amplifier, said current sense amplifier circuit comprising a switched capacitor stage comprising an operational amplifier, a plurality of switches and capacitors connected to said operational amplifier so that said operational amplifier is configured alternately as a buffer and charge transfer circuit responsive to a pair of complementary control signals applied to said switches.

12. An integrated current mode switching drive system according to claim 11, wherein said current sense amplifier further comprises a sample and hold circuit connected between an output of the switched capacitor stage and the first input of said differential error amplifier.

13. An integrated current mode switching drive system according to claim 11, further comprising at least one output transistor for supplying current to the external load, and at least one driver connected to said at least one output transistor.

14. An integrated current mode switching drive system according to claim 11, wherein said plurality of capacitors comprises first and second input capacitors connected to respective first and second inputs of the operational amplifier.

15. An integrated current mode switching drive system according to claim 14, wherein the first and second capacitors have substantially equal capacitance values.

16. An integrated current mode switching drive system according to claim 14, wherein said plurality of capacitors further comprises a feedback capacitor connected between an input and an output of said operational amplifier.

17. An integrated current mode switching drive system according to claim 16, wherein the first and second capacitors have substantially equal capacitance values; and wherein the feedback capacitor has a capacitance value equal to about one half of the capacitance value of the first and second input capacitors.

18. An integrated current mode switching drive system according to claim 16, wherein said plurality of switches comprises:

first and second input switches connected in series between respective ones of said first and second input capacitors and said sensing resistor.

19. An integrated current mode switching drive system according to claim 18, wherein said plurality of switches further comprises a third switch connected across the first and second input capacitors.

20. An integrated current mode switching drive system according to claim 19, wherein said plurality of switches further comprises a fourth switch connected in parallel with said feedback capacitor.

21. An integrated current mode switching drive system according to claim 11, wherein the voltage reference is smaller than a differential voltage at the input of said current sense amplifier circuit.

22. A method of providing current for an external load using a current sense amplifier circuit configured as a switched capacitor stage, the method comprising the steps of:

applying a first control voltage and a reference voltage to respective first and second inputs of a differential error amplifier;

receiving a second control signal via a first resistor connected to the first input of the differential error amplifier;

receiving a third control signal via a second resistor connected to the first input of the differential error amplifier;

connecting a third resistor in series with the external load;

generating the third control signal from the current sense amplifier circuit having an input connected across the third resistor, the current sense amplifier comprising an operational amplifier having a plurality of switches and capacitors connected to the operational amplifier so that the operational amplifier is configured alternately as a buffer and charge transfer circuit responsive to a pair of complementary control signals applied to the switches, and connecting a sample and hold circuit having an input connected to an output of the switched capacitor stage and having an output generating the third control signal.

23. A method according to claim 22, further comprising the step of supplying current to the external load via at least one output transistor, and connecting at least one driver to the at least one output transistor.

24. A method according to claim 22, further comprising the step of connecting first and second input capacitors to respective first and second inputs of the operational amplifier.

25. A method according to claim 24, wherein the first and second capacitors have substantially equal capacitance values.

26. A method according to claim 24, further comprising the step of connecting a feedback capacitor between an input and an output of the operational amplifier.

27. A method according to claim 26, wherein the first and second capacitors have substantially equal capacitance values, and wherein the feedback capacitor has a capacitance value equal to about one half of the capacitance value of the first and second input capacitors.

28. A method according to claim 22, wherein the voltage reference is smaller than a differential voltage at the input of the current sense amplifier circuit.

* * * * *